(12) United States Patent
Dadheech et al.

(10) Patent No.: US 10,622,627 B2
(45) Date of Patent: Apr. 14, 2020

(54) FORMING SULFUR-BASED POSITIVE ELECTRODE ACTIVE MATERIALS

(71) Applicant: GM GLOBAL TECHNOLOGY OPERATIONS LLC, Detroit, MI (US)

(72) Inventors: Gayatri V. Dadheech, Bloomfield Hills, MI (US); Xingcheng Xiao, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 15/964,179

(22) Filed: Apr. 27, 2018

(65) Prior Publication Data

US 2018/0248182 A1    Aug. 30, 2018

Related U.S. Application Data

(62) Division of application No. 14/945,151, filed on Nov. 18, 2015, now Pat. No. 9,985,284.

(51) Int. Cl.

| | |
|---|---|
| *H01M 4/58* | (2010.01) |
| *H01M 4/36* | (2006.01) |
| *H01M 4/62* | (2006.01) |
| *H01M 4/38* | (2006.01) |
| *H01M 4/13* | (2010.01) |
| *H01M 10/052* | (2010.01) |

(52) U.S. Cl.
CPC ............. *H01M 4/366* (2013.01); *H01M 4/13* (2013.01); *H01M 4/38* (2013.01); *H01M 4/624* (2013.01); *H01M 4/625* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 7,718,156 B2 | 5/2010 | Zhang et al. | |
| 2002/0009639 A1 | 1/2002 | Miyake et al. | |
| 2009/0208780 A1 | 8/2009 | Sun et al. | |
| 2013/0323595 A1* | 12/2013 | Sohn ..................... | H01M 4/134 429/221 |
| 2013/0330619 A1* | 12/2013 | Archer .................. | H01M 4/136 429/213 |
| 2014/0099560 A1* | 4/2014 | Parans Paranthaman ................... | H01M 4/483 429/405 |

FOREIGN PATENT DOCUMENTS

| | | |
|---|---|---|
| CN | 103779546 A | 5/2014 |
| CN | 104269559 A | 1/2015 |
| KR | 20140135422 A | 11/2014 |
| WO | WO-2012064702 A2 | 5/2012 |

\* cited by examiner

*Primary Examiner* — Yoshitoshi Takeuchi
(74) *Attorney, Agent, or Firm* — Harness, Dickey & Pierce, P.L.C.

(57) ABSTRACT

In an example of a method for making a sulfur-based positive electrode active material, a carbon layer is formed on a sacrificial nanomaterial. The carbon layer is coated with titanium dioxide to form a titanium dioxide layer. The sacrificial nanomaterial is removed to form a hollow material including a hollow core surrounded by a carbon and titanium dioxide double shell. Sulfur is impregnated into the hollow core.

20 Claims, 2 Drawing Sheets

FORMING SULFUR-BASED POSITIVE ELECTRODE ACTIVE MATERIALS

CROSS-REFERENCE TO RELATED APPLICATIONS

This application is a divisional of United States Patent Application No. 14/945,151 filed on Nov. 18, 2015 issued as U.S. Pat. No. 9,985,284. The entire disclosure of the above application is incorporated herein by reference.

BACKGROUND

Secondary, or rechargeable, lithium-based batteries are often used in many stationary and portable devices such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium ion batteries to undergo repeated power cycling over their useful lifetimes makes them an attractive and dependable power source.

SUMMARY

In an example of a method for making a sulfur-based positive electrode active material, a carbon layer is formed on a sacrificial nanomaterial. The carbon layer is coated with titanium dioxide to form a titanium dioxide layer. The sacrificial nanomaterial is removed to form a hollow material including a hollow core surrounded by a carbon and titanium dioxide double shell. Sulfur is impregnated into the hollow core.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
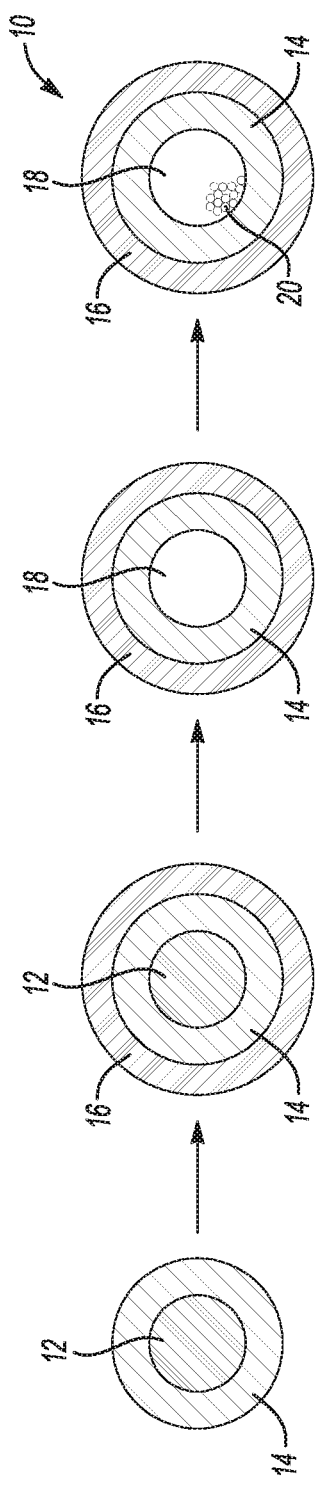
FIGS. 1A through 1D are schematic, cross-sectional views which together illustrate an example of a method for making an example of a sulfur-based positive electrode active material.

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted/intercalated into the negative electrode, and during discharging, lithium ions are extracted from the negative electrode. Each of the electrodes is also associated with respective current collectors, which are connected by an interruptible external circuit that allows an electric current to pass between the negative and positive electrodes. One example of lithium-based batteries includes the lithium sulfur battery.

The high theoretical capacity (e.g., 1672 mAh/g) of sulfur renders it desirable for use as a positive electrode material in lithium sulfur batteries. However, it has been found that positive electrode materials with high specific capacities also undergo large electromechanical (volume) expansion and contraction during charging/discharging of the battery. The large volume change (e.g., about 80% for sulfur) experienced by the electrode materials during charging/discharging causes the respective material to fracture, decrepitate, or otherwise mechanically degrade, which results in a loss of electrical contact and poor life cycling.

Moreover, the life cycle of lithium sulfur batteries may be limited by the migration, diffusion, or shuttling of certain species from the positive electrode during the battery discharge process, through the porous polymer separator, to the negative electrode.

In lithium sulfur batteries, this species includes $S_x$ polysulfides generated at a sulfur-based positive electrode. The $S_x$ polysulfides generated at the sulfur-based positive electrode are soluble in the electrolyte, and can migrate to the negative electrode where they react with the negative electrode in a parasitic fashion to generate lower-order polysulfides. These lower-order polysulfides diffuse back to the positive electrode and regenerate the higher forms of polysulfide. As a result, a shuttle effect takes place. This effect leads to decreased sulfur utilization, self-discharge, poor cycleability, and reduced Coulombic efficiency of the battery. It is believed that even a small amount of polysulfide at the negative electrode can lead to parasitic loss of active lithium at the negative electrode, which prevents reversible electrode operation and reduces the useful life of the lithium sulfur battery.

In the examples disclosed herein, a cage-like structure is formed and a sulfur-based active material is impregnated into the cage-like structure. This cage-like structure includes a porous, double shell with a layer of carbon and a layer of titanium dioxide ($TiO_2$). When the $TiO_2$ layer is doped, the double shell can act as an excellent electronic conductor in order to conduct electrons during a battery operation. Additionally, the active material is present in a hollow core that is surrounded by the cage-like structure. The hollow core accommodates the volumetric expansion and contraction of the active material during charging/discharging cycles.

Referring now to FIGS. 1A through 1D, one example of the method for making the positive electrode active material 10 (shown in FIG. 1D) is depicted. As shown in FIG. 1A, this example of the method forms a carbon layer 14 on a sacrificial nanomaterial 12.

The sacrificial nanomaterial 12 may be in the form of nanoparticles, nanorods, nanofibers, or nanowires. The sacrificial nanomaterial 12 may have at least one dimension on the nanoscale (e.g., up to 1000 nm), and in some instances, may have at least one dimension up to about 20 µm. The sacrificial nanomaterial 12 may be formed of aluminum oxide or a polymer. Examples of the polymer sacrificial nanomaterial 12 include aluminum alkoxide polymers, titanium alkoxide polymers, zinc alkoxide polymers, titanium organo nitride, polyester, polyurea, polyimides, poly(vinyl chloride), epoxy resins, or the like.

A carbon layer 14 is then formed on the sacrificial nanomaterial 12. The carbon may be deposited using any suitable technique. In one example, the carbon layer 14 is formed using reactive sputtering with graphite as the target. In another example, the carbon layer 14 is formed by simultaneously exposing a solid graphite target to a plasma treatment and an evaporation treatment. The simultaneous plasma and evaporation treatments may be accomplished using pulsed laser deposition, a combination of cathodic arc deposition and laser arc deposition, a combination of plasma exposure and electron beam (e-beam) exposure, a combination of plasma exposure and laser arc deposition, magnetron sputtering, or plasma enhanced chemical vapor deposition. In an example, the maximum deposition rate ranges from about 48 nm/min to about 100 nm/min, which can be achieved with a pulse repetition rate ranging from about 1 kHz to about 10 kHz. Still other suitable examples for depositing the carbon include physical vapor deposition (PVD), electron beam evaporation, magnetron sputter deposition, chemical vapor deposition (CVD), molecular layer deposition (MLD), atomic layer deposition (ALD), or a wet chemical process.

The carbon layer 14 is a porous, electrically conductive, continuous coating formed on the surface of the sacrificial nanomaterial 12. The carbon layer 14 may be made up of graphitic carbon, having an sp2/sp3 ratio ranging from about 70/30 to about 100/1. In an example, the ratio of $sp^2$ carbon to $sp^3$ carbon in the carbon coating is about 74 to about 26. Depending upon the deposition process that is used, the ratio of $sp^2$ carbon to $sp^3$ carbon may be changed by altering the growth rate, the precursor (target) that is used, and/or the deposition temperature. For example, lowering the deposition temperature to room temperature (e.g., from about 18° C. to about 22° C.) can result in the formation of a primarily graphitic carbon layer.

The carbon layer 14 may also be doped with titanium or silicon. In an example, the dopant makes up less than 20% of the carbon layer 14. Doping the carbon layer 14 may be accomplished using a co-sputtering process.

In an example, the carbon layer 14 has thickness ranging from about 5 nm to about 50 nm.

Titanium dioxide is then coated on the carbon layer 14 to form a titanium dioxide ($TiO_2$) layer 16. The titanium dioxide may be deposited using any suitable technique. In one example, the $TiO_2$ layer 16 is formed via plasma enhanced chemical vapor deposition, chemical vapor deposition, molecular layer deposition, atomic layer deposition, or a wet chemical process.

The $TiO_2$ layer 16 is a porous, continuous coating formed on the surface of the carbon layer 14. The $TiO_2$ layer 16 may be tailored to be conductive. For example, the $TiO_2$ layer 16 may be doped with a conductive additive (such as nitrogen, sulfur, phosphorus, boron, silver, iron and/or vanadium). During deposition of the $TiO_2$ layer 16, argon and the dopant may be mixed with nitrogen gas. In an example, the dopant makes up less than 20% of the $TiO_2$ layer 16. The $TiO_2$ layer 16 may undergo a phase transition to render the layer 16 conductive. For example, the $TiO_2$ layer 16 may be exposed to annealing in the presence of the dopant after it is deposited. For another example, the deposition parameters during $TiO_2$ deposition may be altered to initiate the phase transition in the presence of the dopant.

In an example, the $TiO_2$ layer 16 has a thickness ranging from about 2 nm to about 20 nm.

The $TiO_2$ layer 16 forms an artificial solid electrolyte interface (SEI) layer at the exterior of the positive electrode active material 10 (see FIG. 1D). The $TiO_2$ layer 16 minimizes or inhibits the interfacial reactions between the electrolyte and the sulfur 20 that is impregnated into the hollow core 18. This prevents an additional SEI layer from growing on the surface of the nanomaterial 12, or reduces the level at which an additional SEI layer grows on the surface of the nanomaterial 12.

When a wet chemical process is used to deposit each of the layers 14 and 16, a layer-by-layer deposition process or sol-gel deposition process may be used. In these types of processes, a precursor bath is used to form each layer, and the precursor is changed depending upon the layer 14, 16 to be formed. In the precursor bath, the precursor chemisorbs and bonds to the sacrificial nanomaterial 12 or the layer 14 formed thereon to form the layer 14 or 16. Examples of suitable precursors for the carbon layer 14 include graphite or other carbon nanoparticles or nanofibers in a suitable resin mixture (e.g., polyimide amide). Examples of suitable precursors for the $TiO_2$ layer 14 include titanium isopropoxide, titanium isopropoxide, colloidal titania, titanium alkoxide $Ti(OR)_4$, titanic acid and derivatives thereof, Titanium (IV) EDTA, ammonium citraperoxotitanates, organometallic titanium salt, and mixtures thereof.

Referring now to FIG. 1C, the sacrificial nanomaterial 12 is then removed to form the hollow core 18 surrounded by the double shell, which includes the carbon layer 14 and the $TiO_2$ layer 16. Both the carbon layer 14 and the $TiO_2$ layer 16 are porous, and a solvent that can leach out the sacrificial nanomaterial 12 (while leaving the other layers 14, 16 intact) may be used to remove the sacrificial nanomaterial 12. For example, an alkali solution may be used to remove the aluminum oxide sacrificial nanomaterial 12. Examples of the alkali solution are alkali metal oxides, such as 1M NaOH or 1 M KOH. When aluminum oxide is utilized, hydrofluoric acid (HF) is not used. For another example, an organic solvent may be used to remove the polymer nanomaterial 12. Any organic solvent may be selected that will dissolve the polymer sacrificial nanomaterial 12 and not affect the other layers 14, 16. Examples of suitable solvents for dissolving examples of the polymer sacrificial nanomaterial 12 include benzene, xylene, anisole, or derivatives thereof. In one example, the polymer sacrificial nanomaterial 12 is an epoxy resin that can be removed with acetone, toluene, etc. When the polymer sacrificial nanomaterial 12 is utilized, it may alternatively be removed via heating. Heating causes the polymer sacrificial nanomaterial 12 to decompose. In an example, heating to greater than 80° C. is suitable for decomposing some examples of the polymer sacrificial nanomaterial 12. In one example, the polymer sacrificial nanomaterial 12 is poly(vinyl chloride) that can be removed by heating at a temperature >200° C. in an inert atmosphere. Still further, when the polymer sacrificial nanomaterial 12 is utilized, it may alternatively be removed via plasma etching (e.g., via oxygen, $CF_4$, or CO).

The amount of space that makes up the hollow core 18 may depend upon the dimensions of the sacrificial nanomaterial 12.

After the hollow core 18 is formed, sulfur 20 may be incorporated into the hollow core 18 using an impregnation process. This is shown in FIG. 1D. An example of the impregnation process involves mixing the double shell structure (shown in FIG. 1C) with elemental sulfur 20 at a weight ratio ranging from 1:2 to 1:5 to form a mixture. The mixture is then encapsulated in a tube or a container, which can be pumped down to a vacuum below 200 mtorr. The encapsulated mixture is vacuumed and sealed. The sealed mixture is then exposed to a temperature for a predetermined time in order to infuse the elemental sulfur 20 into the hollow core 18 of the double shell structure. The sealed mixture may be exposed to the temperature under vacuum conditions. When the sulfur impregnation process is accomplished via melt infusing, the temperature ranges from about 115° C. to about 165° C. and the predetermined time ranges from about 5 hours to about 20 hours under vacuum. In this example, the predetermined time may range from about 5 hours to about 10 hours. When the sulfur impregnation process is accomplished via vapor infusing, the temperature ranges from about 444° C. to about 500° C. and the predetermined time ranges from about 5 hours to about 20 hours under vacuum. In this example, the predetermined time may range from about 5 hours to about 10 hours.

The sulfur-based positive electrode active material 10 may be referred to as a yolk-double shell structure, at least in part because at least some of the sulfur 20 is like a yolk within the double shell structure of the carbon layer 14 and the $TiO_2$ layer 16. More particularly, the sulfur 20 may not fill the entire volume of the hollow core 18. As such, it is believed that a void (e.g., free space, unoccupied space) remains at/near the center of the active material 10. In an example, a maximum amount of the sulfur 20 that is present in the hollow core 18 after impregnation is believed to occupy less than 90% of the hollow core volume. In an example, the weight percentage of sulfur 20 in the active material 10 ranges from about 75 wt % to about 85 wt % of the total active material weight percent. The portion of the hollow core 18 that remains as the void provides space to accommodate the volumetric expansion and contraction of the sulfur 20 during battery cycling. In addition to being present within the hollow core 18, the sulfur 22 may also be present on the various surfaces of the carbon layer 14 due to the low contact angle (about 4.3°) or good wettability between graphite and sulfur.

Additionally, the cage-like structure of the carbon layer 14 and the $TiO_2$ layer 16 secures the sulfur 20 therein. As such, even if the sulfur 20 breaks apart, it is contained within the hollow core 18 by the carbon layer 14 and the $TiO_2$ layer 16, which may keep the nanomaterial 12 pieces in conductive contact with each other. The cage-like, double shell structure of the carbon layer 14 and the $TiO_2$ layer 16 also protects the sulfur 20, and thus suppresses polysulfide dissolution into the electrolyte. As such, the cage-like double shell structure of the carbon layer 14 and the $TiO_2$ layer 16 can mitigate the shuttle effect, and in turn improve the efficiency and life cycle of the lithium sulfur battery.

It is to be understood that the positive electrode active material 10 disclosed herein may be utilized as the active material in a positive electrode for a lithium sulfur battery. The positive electrode active material 10 may be combined with an additional conductive filler and/or a binder to form the positive electrode.

Since the positive electrode active material 10 includes the conductive carbon layer 14, the additional conductive filler may or may not be included when forming the positive electrode. When included, the conductive filler may be a conductive carbon material. The conductive carbon material may be a high surface area carbon, such as acetylene black (e.g., SUPER P® conductive carbon black from TIMCAL). The conductive filler may be included to enhance electron conduction between the positive electrode active material 10 and a positive-side current collector.

The binder may be used to structurally hold the positive electrode active material 10 together within the positive electrode. Examples of the binder include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethyleneimine, polyimide, or any other suitable binder material. Other suitable binders include polyvinyl alcohol (PVA), sodium alginate, or other water-soluble binders.

In an example of the method for making the positive electrode with the sulfur-based electrode active materials 10, the sulfur-based electrode active material 10 may be mixed with the conductive fillers and the binder(s).

The respective components may be manually mixed by dry-grinding. After all these components are ground together, the ground components are combined with water or organic solvent (depending on the binder used) to form the dispersion/mixture. In an example, the solvent is a polar aprotic solvent. Examples of suitable polar aprotic solvents include dimethylacetamide (DMAC), N-methyl-2-pyrrolidone (NMP), dimethylformamide (DMF), dimethylsulfoxide (DMSO), or another Lewis base, or combinations thereof.

The dispersion/mixture may be mixed by milling. Milling aids in transforming the dispersion/mixture into a coatable slurry. Low-shear milling or high-shear milling may be used to mix the dispersion/mixture. The dispersion/mixture milling time ranges from about 10 minutes to about 20 hours depending on the milling shear rate. In an example, a rotator mixer is used for about 20 minutes at about 2000 rpm to mill the dispersion/mixture.

In an example of the dispersion/mixture for the positive electrode, the amount of the sulfur-based positive electrode active materials 10 ranges from about 70 wt. % to about 95 wt. % (based on total solid wt. % of the dispersion/mixture), the amount of the conductive filler ranges from 0 wt. % to about 15 wt. % (based on total solid wt. % of the dispersion/mixture), and the amount of the binder ranges from about 5 wt. % to about 15 wt. % (based on total solid wt. % of the dispersion/mixture).

The slurry is then coated or deposited onto the respective current collector (e.g., copper for the negative electrode and aluminum for the positive electrode). The slurry may be deposited using any suitable technique. As examples, the slurry may be cast on the surface of the current collector, or may be spread on the surface of the current collector, or may be coated on the surface of the current collector using a slot die coater.

The deposited slurry may be exposed to a drying process in order to remove any remaining solvent and/or water. Drying may be accomplished using any suitable technique. For example, drying may be performed at an elevated temperature ranging from about 60° C. to about 130° C. In some examples, vacuum may also be used to accelerate the drying process. As one example of the drying process, the deposited slurry may be exposed to vacuum at about 120° C. for about 12 to 24 hours. The drying process results in the formation of the positive electrode.

Figure 2:
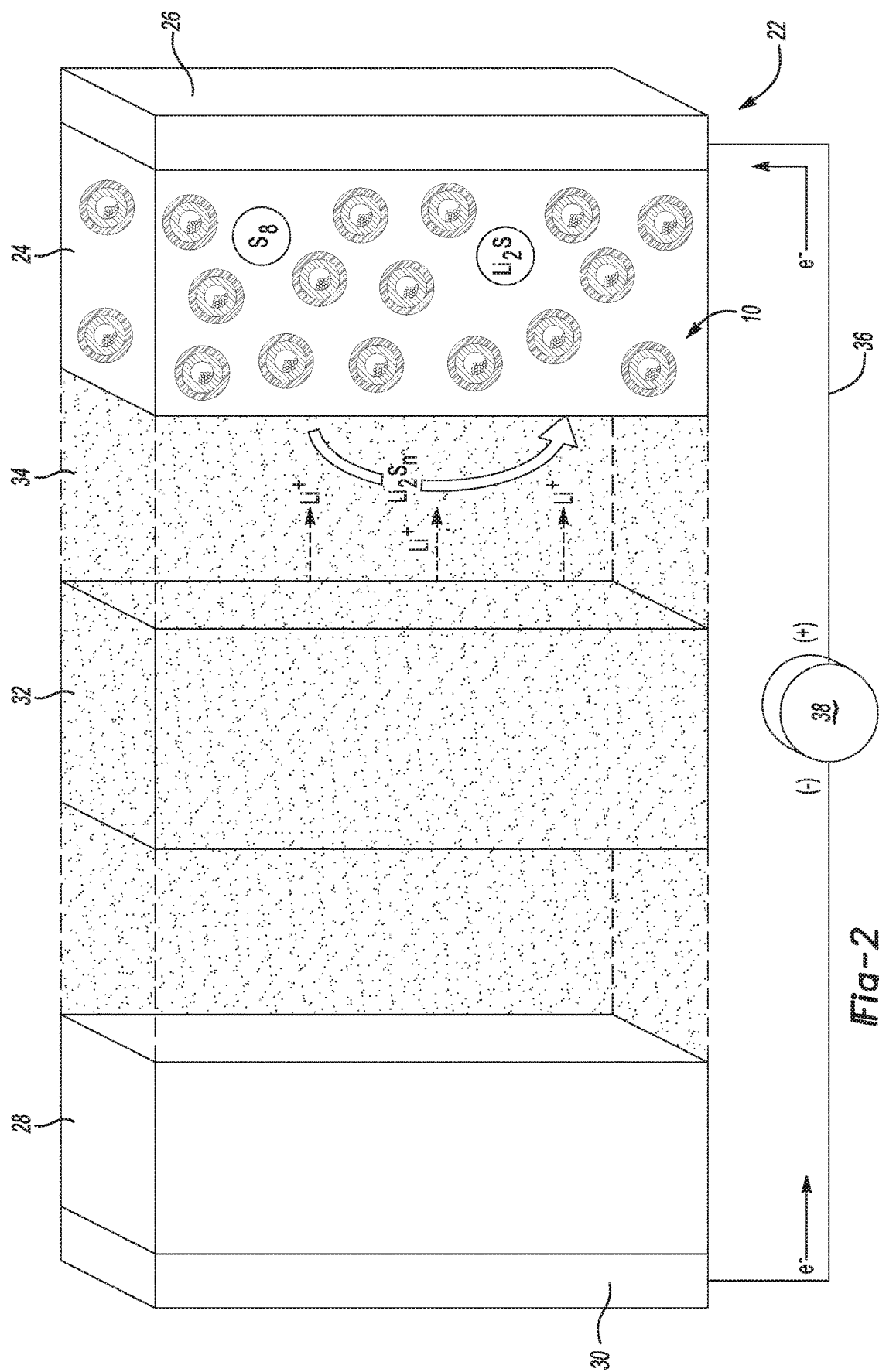
FIG. 2 is a perspective schematic view of a lithium sulfur battery showing a discharging state, the battery including a positive electrode formed with an example of the sulfur-based positive electrode active material disclosed herein.

An example of the positive electrode 24 formed with the positive electrode active material 10 is depicted in FIG. 2, which also shows an example of the lithium sulfur battery 22.

In the lithium sulfur battery 22, the positive electrode 24 on the positive-side current collector 26 is paired with a negative electrode 28 on a negative side current collector 30. The current collectors 26, 30 collect and move free electrons to and from an external circuit 36. The positive-side current collector 26 may be formed from aluminum or any other appropriate electrically conductive material known to skilled artisans. The negative-side current collector 30 may be formed from copper or any other appropriate electrically conductive material known to skilled artisans.

The negative electrode 28 of the lithium sulfur battery 22 may include any lithium host material that can sufficiently undergo lithiation and delithiation with copper functioning as the negative terminal/current collector 30 of the lithium sulfur battery 22. Examples of suitable negative electrode active materials include graphite, lithium titanate, lithiated silicon (e.g., $LiSi_x$), lithiated tin, or lithium foil. Graphite may be desirable for the negative electrode 28 because it exhibits reversible lithium intercalation and deintercalation characteristics, is relatively non-reactive, and can store lithium in quantities that produce a relatively high energy density. Commercial forms of graphite that may be used to fabricate the negative electrode 28 are available from, for example, Timcal Graphite & Carbon (Bodio, Switzerland), Lonza Group (Basel, Switzerland), or Superior Graphite (Chicago, Ill.).

The negative electrode 28 may also include any of the conductive fillers and binders previously described.

The lithium sulfur battery 22 also includes the porous polymer separator 32 positioned between the positive and negative electrodes 24, 28. The porous polymer separator 32 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators 22 include single layer polypropylene membranes, such as CELGARD 2400 and CELGARD 2500 from Celgard, LLC (Charlotte, NC). It is to be understood that the porous separator 32 may be coated or treated, or uncoated or untreated. For example, the porous separator 32 may or may not be coated or include any surfactant treatment thereon.

In other examples, the porous separator 32 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous separator 32 is poly(p-hydroxybenzoic acid). In yet another example, the porous separator 32 may be chosen from a combination of the polyolefin (such as PE and/or PP) and one or more of the other polymers listed above.

The porous separator 32 may be a single layer or may be a multi-layer (e.g., bilayer, trilayer, etc.) laminate fabricated from either a dry or wet process.

In the lithium sulfur battery 22, the porous polymer separator 32 operates as both an electrical insulator and a mechanical support. The porous polymer separator 32 is sandwiched between the positive electrode 24 and the negative electrode 28 to prevent physical contact between the two electrodes 24, 28 and the occurrence of a short circuit. The porous polymer separator 32, in addition to providing a physical barrier between the two electrodes 24, 28 ensures passage of lithium ions (identified by the $Li^+$) and some related anions through an electrolyte solution 34 filling its pores.

Any appropriate electrolyte solution 34 that can conduct lithium ions between the negative electrode 28 and the positive electrode 24 may be used in the lithium sulfur battery 22. In one example, the non-aqueous electrolyte solution may include lithium salt(s) dissolved in an ether based organic solvent. The ether based organic solvent may be composed of cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LITFSI), $LiN(CF_3SO_2)_2$ (LITFSI), $LiPF_6$, $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiNO_3$, $LiPF_3(CF_3)_3$, $LiSO_3CF_3$, and mixtures thereof. In an example, the concentration of the salt in the electrolyte solution 34 is about 1 mol/L. $LiNO_3$ may also be added to the electrolyte solution 34 as another additive, in addition to another lithium salt. In these instances, the concentration of the lithium salt may be about 0.6 mol/L plus the $LiNO_3$ additive.

The lithium sulfur battery 22 also includes the interruptible external circuit 36 that connects the positive electrode 24 and the negative electrode 28. The lithium sulfur battery 22 may also support a load device 38 that can be operatively connected to the external circuit 36. The load device 38 may be powered fully or partially by the electric current passing through the external circuit 36 when the lithium sulfur battery 22 is discharging. While the load device 38 may be any number of known electrically-powered devices, a few specific examples of a power-consuming load device include an electric motor for a hybrid vehicle or an all-electrical vehicle, a laptop computer, a cellular phone, and a cordless power tool. The load device 38 may also, however, be a power-generating apparatus that charges the lithium sulfur battery 22 for purposes of storing energy. For instance, the tendency of windmills and solar panels to variably and/or intermittently generate electricity often results in a need to store surplus energy for later use.

The lithium sulfur battery 22 can include a wide range of other components that, while not depicted here, are nonetheless known to skilled artisans. For instance, the lithium sulfur battery 22 may include a casing, gaskets, terminals, tabs, and any other desirable components or materials that may be situated between or around the positive electrode 24 and the negative electrode 28 for performance-related or other practical purposes. Moreover, the size and shape of the lithium sulfur battery 22, as well as the design and chemical make-up of its main components, may vary depending on the particular application for which it is designed. Battery-powered automobiles and hand-held consumer electronic devices, for example, are two instances where the lithium sulfur battery 22 would most likely be designed to different size, capacity, and power-output specifications. The lithium sulfur battery 22 may also be connected in series and/or in parallel with other similar lithium sulfur batteries 22 to produce a greater voltage output and current (if arranged in parallel) or voltage (if arranged in series) if the load device 38 so requires.

The lithium sulfur battery 22 can generate a useful electric current during battery discharge (shown in FIG. 2). During discharge, the chemical processes in the battery 22 include lithium ($Li^+$) dissolution from the negative electrode 28 and incorporation of the lithium cations into sulfur or high form polysulfide anions (i.e., $S_x^{2-}$) within the sulfur-based positive electrode active materials 10. As such, polysulfides are formed (sulfur is reduced) within the active materials 10 in the positive electrode 24 in sequence while the battery 22 is discharging. The chemical potential difference between the positive electrode 24 and the negative electrode 28 (ranging from approximately 1.5V to 3.0V, depending on the exact chemical make-up of the electrodes 24, 28) drives electrons produced by the dissolution of lithium at the negative electrode 28 through the external circuit 36 towards the positive electrode 24. The resulting electric current passing through the external circuit 36 can be harnessed and directed through the load device 38 until the level of intercalated lithium in the negative electrode 28 falls below a workable level or the need for electrical energy ceases.

The lithium sulfur battery 22 can be charged or re-powered at any time by applying an external power source to the lithium sulfur battery 44 to reverse the electrochemical reactions that occur during battery discharge. During charging (not shown), lithium plating to the negative electrode 28 takes place and sulfur formation at the positive electrode 24 takes place. The connection of an external power source to the lithium sulfur battery 22 compels the otherwise non-spontaneous oxidation of lithium at the positive electrode 24 to produce electrons and lithium ions. The electrons, which flow back towards the negative electrode 28 through the external circuit 36, and the lithium ions ($Li^+$), which are carried by the electrolyte 34 across the porous polymer separator 32 back towards the negative electrode 28, reunite at the negative electrode 28 and replenish it with lithium for consumption during the next battery discharge cycle. The external power source that may be used to charge the lithium sulfur battery 22 may vary depending on the size, construction, and particular end-use of the lithium sulfur battery 22. Some suitable external power sources include a battery charger plugged into an AC wall outlet and a motor vehicle alternator.

It is to be understood that the ranges provided herein include the stated range and any value or sub-range within the stated range. For example, a range of from about 5 nm to about 50 nm should be interpreted to include not only the explicitly recited limits of from about 5 nm to about 50 nm, but also to include individual values, such as 12 nm, 25.5 nm, etc., and sub-ranges, such as from about 20 nm to about 40 nm, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. An active material for a sulfur-battery electrode having a cage-like structure comprising:
    a carbon layer forming a hollow core, wherein the carbon layer comprises a first dopant; and
    a titanium dioxide layer disposed on an exposed surface of the carbon layer, wherein the carbon layer and the titanium dioxide layer together form the cage-like structure, wherein the titanium dioxide layer comprises a second dopant, and wherein the hollow core is impregnated with sulfur.

2. The active material of claim 1, wherein the carbon layer comprises graphitic carbon having a $sp^2$:$sp^3$ ratio ranging from about 70/30 to about 100/1.

3. The active material of claim 1, wherein the carbon layer has a thickness greater than about 5 nm to less than about 50 nm.

4. The active material of claim 1, wherein the first dopant comprises at least one of titanium or silicon.

5. The active material of claim 1, wherein the second dopant comprises at least one of nitrogen, sulfur, phosphorus, boron, silver, iron, or vanadium.

6. The active material of claim 1, wherein the titanium dioxide layer has a thickness greater than about 2 nm to less than about 20 nm.

7. The active material of claim 1, wherein the carbon layer and the titanium dioxide layer are porous.

8. The active material of claim 1, wherein the carbon layer comprises greater than 0% and less than 20% of the first dopant and the titanium dioxide layer comprises greater than 0% and less than 20% of the second dopant.

9. The active material of claim 1, wherein the hollow core is occupied by less than about 90 wt.% of sulfur.

10. An active material for a sulfur-battery electrode having a cage-like structure comprising:
    a porous carbon layer forming a hollow core, wherein the carbon layer comprises a first dopant selected from the group consisting of: titanium, silicon, and combinations thereof and the hollow core is impregnated with sulfur; and
    a porous titanium dioxide layer disposed on an exposed surface of the carbon layer, wherein the carbon layer and the titanium dioxide layer together form the cage-like structure, wherein the titanium dioxide layer comprises a second dopant selected from the group consisting: nitrogen, sulfur, phosphorus, boron, silver, iron, vanadium, and combinations thereof.

11. A positive electrode for a sulfur battery, comprising:
    an active material, including:
        a cage-like structure comprising a double shell including a carbon layer coated with a titanium dioxide layer, wherein the carbon layer comprises a first dopant and the titanium dioxide layer comprises a second dopant;
        a hollow core surrounded by the double shell; and
        sulfur disposed within the hollow core.

12. The positive electrode of claim 11 wherein the titanium dioxide layer is rendered conductive by the second dopant.

13. The positive electrode of claim 11 wherein the second dopant in the titanium dioxide layer comprises at least one of nitrogen, sulfur, phosphorus, boron, silver, iron, or vanadium; and the first dopant in the carbon layer comprises at least one of titanium or silicon.

14. The positive electrode of claim 11 wherein the carbon layer comprises graphitic carbon.

15. The positive electrode of claim 14, wherein the graphitic carbon has a $sp^2:sp^3$ ratio of about 74:26.

16. The positive electrode of claim 11, wherein the carbon layer comprises less than 20% of the first dopant and the titanium dioxide layer comprises less than 20% of the second dopant.

17. The positive electrode of claim 11, wherein less than about 90 wt.% of the hollow core is occupied by sulfur.

18. The positive electrode of claim 11, wherein the carbon layer has a thickness of greater than about 5 nm and the titanium dioxide layer has a thickness of greater than about 2 nm.

19. The positive electrode of claim 11, further comprising a conductive filler.

20. The positive electrode of claim 19, further comprising a binder selected from polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethyleneimine, polyimide, polyvinyl alcohol (PVA), and sodium alginate.

\* \* \* \* \*